United States Patent [19]
Uno et al.

[11] Patent Number: 4,902,075
[45] Date of Patent: Feb. 20, 1990

[54] BRAKING APPARATUS FOR VEHICLE

[75] Inventors: Haruhiko Uno, Okazaki; Yuzo Imoto; Tetuya Izumi, both of Kariya; Toshihiro Takei, Okazaki, all of Japan

[73] Assignee: Nippondenso Co., Ltd., Kariya, Japan

[21] Appl. No.: 247,392

[22] Filed: Sep. 21, 1988

[30] Foreign Application Priority Data

Sep. 24, 1987 [JP] Japan ................. 62-239496

[51] Int. Cl.⁴ ............................................. B60T 8/32
[52] U.S. Cl. ..................................... 303/14; 60/545;
60/555; 188/358; 303/113; 303/114; 303/119
[58] Field of Search ...................... 303/10–12,
303/13–18, 2–3, 92, 93, 100, 110, 113–119,
DIG. 3–4, DIG. 1–DIG. 2, 6.01, 84.1, 84.2,
104, 50, 25, 52; 188/355–360, 181; 60/555,
547.1, 582, 545, 548, 550, 554, 560, 562, 563,
564, 565, 566

[56] References Cited

U.S. PATENT DOCUMENTS

| | | | |
|---|---|---|---|
| 2,945,352 | 7/1960 | Stelzer | 60/555 X |
| 4,166,654 | 9/1979 | Snodgrass | 303/14 |
| 4,416,491 | 11/1983 | Belart et al. | |
| 4,428,623 | 1/1984 | Bertling et al. | |
| 4,576,417 | 3/1986 | Dobner | 60/545 X |
| 4,620,750 | 11/1986 | Leiber | |
| 4,729,611 | 3/1988 | Kircher et al. | 60/547.1 X |
| 4,730,877 | 3/1988 | Seibert et al. | 303/114 X |
| 4,753,490 | 6/1988 | Belart et al. | 60/545 X |
| 4,755,008 | 7/1988 | Imoto et al. | 303/114 X |
| 4,768,841 | 9/1988 | Watanabe | 303/114 |
| 4,778,225 | 10/1988 | Rudolph et al. | 303/114 |
| 4,778,226 | 10/1988 | Brown | 303/13 X |
| 4,787,685 | 11/1988 | Klein | 60/555 X |
| 4,807,943 | 2/1989 | Ogino | 303/110 X |
| 4,810,042 | 3/1989 | Kono et al. | 60/545 X |
| 4,812,777 | 3/1989 | Shirai | 303/14 |

FOREIGN PATENT DOCUMENTS 58-39551 3/1983 Japan.

Primary Examiner—Douglas C. Butler
Attorney, Agent, or Firm—Cushman, Darby & Cushman

[57] ABSTRACT

A braking apparatus for a vehicle has a booster for receiving, as a pilot pressure, a pressure of a master cylinder and for regulating a pressure from an auxiliary pressure source to a level predetermined times the pilot pressure. The booster is provided with an initial pressure raising mechanism for causing the booster to output a predetermined initial pressure in response to an initial actuation of a brake pedal.

5 Claims, 5 Drawing Sheets

BRAKING APPARATUS FOR VEHICLE

BACKGROUND OF THE INVENTION

The present invention relates to a braking apparatus for a vehicle and, more particularly, to a braking apparatus for a vehicle having an auxiliary pressure source and a traction controlling device for preventing the acceleration slippage at the time of starting.

As shown in Japanese Patent Unexamined Publication No. 57-172863 which corresponds to U.S. Pat. No. 4,416,491, issued Nov. 22, 1983 to Juan Belart, a conventional hydraulic braking apparatus for a vehicle is arranged as follows: A brake booster is disposed in series between a brake pedal and a master cylinder, and the power is boosted in proportion to the stepping force acting on the brake pedal so as to apply a force to a piston of the master cylinder, thereby generating hydraulic pressure. The hydraulic pressure generated is supplied to wheel cylinders through a piping.

With this conventional arrangement, the master cylinder projects a substantial distance from a partition wall disposed between a compartment and an engine room. This arrangement is not desirable from the view point of efficiency of installation inside the relatively small engine room.

For this reason, it is conceivable to employ a hydraulic booster of a type in which the master cylinder is split. However, to separate the master cylinder, it is necessary to transmit the pedal operating force to the hydraulic booster through hydraulic pressure, a wire mechanism or the like. If this arrangement is adopted, friction of sealing parts or structural plays are present, so that a delay in the braking response during the early stage of the pedal operation is unavoidable.

SUMMARY OF THE INVENTION

Accordingly, it is an object of the present invention to provide a braking apparatus for a vehicle which is capable of improving the installation efficiency by installing a booster separately from a master cylinder.

Another object of the present invention is to provide a braking apparatus for a vehicle which is capable of improving the response characteristics during the early part of a brake pedal operation.

The braking apparatus for a vehicle according to the present invention comprises a master cylinder for generating a pressure by the operation of a brake pedal, an auxiliary pressure source for accumulating a pressure, a booster means for receiving as a pilot pressure the pressure of the master cylinder via a pilot pipe and for regulating the pressure supplied from the auxiliary pressure source to a level predetermined times the pilot pressure and then delivering the thus regulated pressure, a wheel cylinder for generating a braking force upon receipt of an output pressure of the booster means, and an initial pressure raising mechanism for causing the booster means to output a predetermined initial pressure in response to an initial operation of the brake pedal.

According to this feature of the invention, during an initial operation of the brake pedal, the initial pressure raising mechanism causes the booster means to output the predetermined initial pressure in response to the initial brake pedal operation. This initial pressure causes the wheel cylinder to generate an appropriate braking force. A further operation of the brake pedal causes the booster means to regulate the pressure from the auxiliary pressure source to a level a predetermined number of times the pressure generated in the master cylinder and output, in addition to the initial pressure, the thus regulated pressure which in turn causes the wheel cylinder to generate a braking force.

DESCRIPTION OF THE PREFERRED EMBODIMENTS

Figure 1:
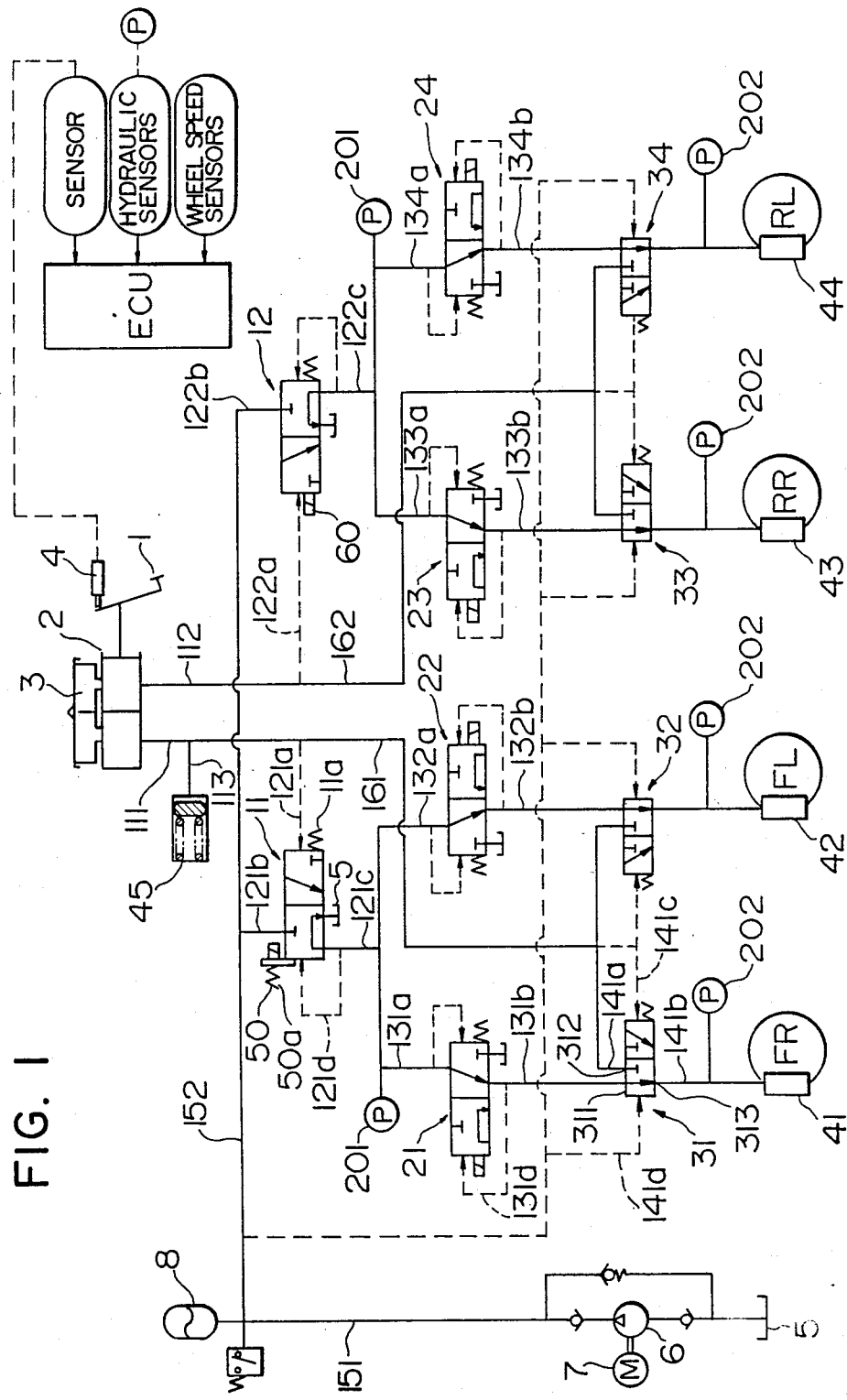
FIG. 1 is a hydraulic circuit diagram illustrating an embodiment of the present invention.
Figure 2:
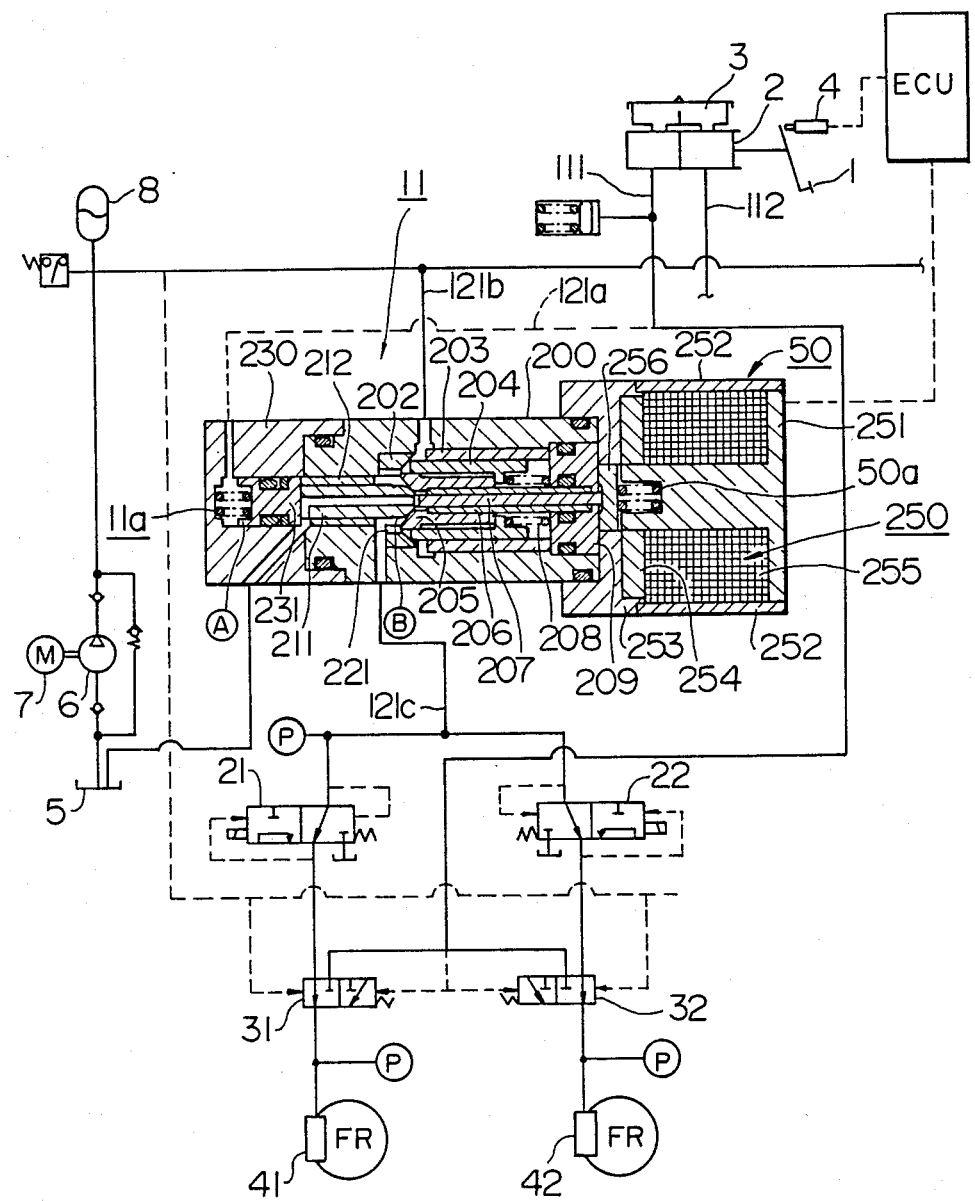
FIG. 2 is a partially schematic diagram illustrating a hydraulic booster for the front wheels shown in FIG. 1.

Referring now to the accompanying drawings, a description will be made of an embodiment of the present invention. When a brake pedal 1 is operated, a master cylinder 2 generates hydraulic pressure. The master cylinder 2 has two chambers for generating hydraulic pressure, to which a first main pipe 111 for the front wheels FR and FL and a second main pipe 112 for the rear wheels RR and RL are connected, respectively. Since the brake circuits for the respective wheels are similar, a description will be made only of the front right wheel FR.

The first main pipe 111 branches off into a pilot pipe 121a which is connected to a hydraulic booster 11, and into a pilot pipe 141c which is connected to a fail-safe valve 31. In addition, a line 113 branching off from the first main pipe 111 is connected to a pedal adjuster 45. The pedal adjuster 45 has a piston disposed in a cylinder to divide the interior thereof into two chambers, to one of which the line 113 is connected, a spring being disposed in the other chamber. An accumulator 8 is supplied with a high pressure of a hydraulic fluid or oil from a reservoir 5 by means of a pump 6. The accumulated hydraulic pressure is transmitted to a pressure pipe 152 which is connected to the hydraulic booster 11 by means of a pressure branch pipe 121b.

The hydraulic booster 11 receives, as a pilot pressure, the hydraulic pressure from the master cylinder 2 through the pilot pipe 121a and mechanically regulates the hydraulic pressure from the accumulator 8 to a level a predetermined time the pilot pressure so as to be delivered to an output pipe 121c. A seal such as an O-ring is provided in a pilot pressure-receiving portion of the hydraulic booster 11, so that a time lag occurs in the output of the predetermined number-fold pressure during the initial stage of brake pedal actuation due to the frictional resistance of that seal. Accordingly, the hydraulic booster 11 is provided with an initial hydraulic pressure raising mechanism 50. This mechanism 50 is arranged in such a manner as to detect the initial operation of the brake pedal by means of a brake switch 4 and operates on the basis of an instruction supplied from an electronic control unit (ECU). The pressure supplied from the hydraulic booster 11 is introduced into a variable pressure reducer 21 via the pressure pipe 121c and a pressure pipe 131a.

The variable pressure reducer 21 is adapted to reduce the output pressure of the hydraulic booster 11, as desired, by means of an electromagnetic force and output the thus reduced pressure to an output pipeline 131b. The output pressure of the variable pressure reducer 21 is connected to a first input port 311 of a fail-safe valve 31. Meanwhile, the pressure of the master cylinder 2 is introduced into a second input port 312 of the valve 31 via a bypass pipe 161. In a first position shown in FIG. 1, the first input port 311 communicates with a third output port 313 and the second input port 312 is closed. In a second position of the fail-safe valve, the first input port 311 is closed, while the second input port 312 and the third output port 313 communicate with each other. Pilot pipes 141d and 141c are connected to the fail-safe valve 31, so that the pressure of the accumulator 8 and that of the master cylinder 2 are introduced into these pilot pipes 141d and 141c, respectively. The third output port 313 of the fail-safe valve 31 is connected to a wheel cylinder 41 through a pipeline 141b. When a hydraulic pressure source is kept at a normal pressure level, the fail-safe valve 31 introduces the output pressure of the variable pressure reducer 21 into the wheel cylinder 41, and when the pressure of the hydraulic source drops and fails, the fail-safe valve 31 is changed over to introduce the output pressure of the master cylinder 2 into the wheel cylinder 41 through the bypass pipe 161. Reference numerals 201 and 202 respectively denote pressure sensors for detecting the output pressure of the hydraulic booster 11 and the pressure of the wheel cylinder 41.

A hydraulic booster 12 for a drive wheel system, i.e., a rear wheel system in FIG. 1, is provided with a boosting mechanism 60 which permits output of the hydraulic pressure even if the output pressure of the master cylinder 2 is not present, thereby making it possible to perform traction control for preventing the slippage of drive wheels during starting and acceleration. The boosting mechanism 60 is of the type that has a solenoid electrically energizable to generate an electromagnetic force which acts on a piston for receiving the master cylinder pressure.

A description will be made later of the specific arrangements of the front wheel hydraulic booster 11, the rear wheel hydraulic booster 12 and the variable pressure reducer 21. With respect to the other hydraulic circuits of the front left wheel (FL) and the rear wheels (RR, RL), however, a description thereof will be omitted since their arrangements are similar to that of the front right wheel (FR).

The operation of the above-described arrangement will now be described by focusing on the front right wheel (FR) in FIG. 1 by way of example. When the pressure of the accumulator 8 is normal and the brake pedal 1 is not actuated, the hydraulic booster, the valves and so on are in the positions shown in FIG. 1, and the pressure in the wheel cylinder 41 is equal to the pressure in the reservoir 5, i.e., the atmospheric pressure.

When the operator actuates the brake pedal 1, the operation of the brake is detected speedily by the brake switch 4. As a result of this detection, the solenoid of the initial hydraulic pressure raising mechanism 50 provided for the hydraulic pressure booster 11 is excited by the ECU to make ineffective a spring 50a which has kept the output pressure of the hydraulic booster 11 communicated with the atmospheric pressure. Consequently, an offset spring 11a is allowed to operate to produce an offset pressure serving as the initial pressure output to the pipeline 121c. If the brake pedal 1 is further actuated, a pressure of the master cylinder 2 is generated, so that a hydraulic pressure equal to the pressure of the master cylinder 2 boosted a predetermined time is output in addition to the offset pressure. At this time, the oil inside the master cylinder 2 has been introduced into the pedal adjuster 45, where an oil of a quantity in proportion to the pressure is accumulated, with the result that an appropriate pedal stroke with respect to the pedal actuating force is attained.

The variable pressure reducer 21 reduces the output pressure of the afore-mentioned hydraulic booster 11 to an appropriate level on the basis of signals supplied from a wheel speed sensor, a G sensor and the like and then supplies the thus reduced pressure to the wheel cylinder 41 so that ideal distribution of the braking force or antiskid control will be attained. The degree of the pressure reduction is determined by an electromagnetic force generated by a solenoid inside the pressure reducer in accordance with an instruction signal from the ECU. The fail-safe valve 31 is in the first position shown in FIG. 1 when the pressure of the accumulator 8 is normal. However, when the hydraulic pressure source fails due, for example, to a reduction in the pressure of the accumulator 8, the pilot pressure of the master cylinder 2 fed through the pilot pipe 141c overcomes the pilot pressure from the hydraulic pressure source fed through the pilot pipe 141d. Hence, the fail-safe valve 31 is changed over to the second position in which the pressure of the master cylinder 2 caused by only the pressing force of the operator acts as a braking force through the bypass pipe 161.

Next, a description will be made of the drive wheels, i.e., the two rear wheels (RR, RL). A description will be given of the operation of the right rear wheel (RR) at the time of traction control during the starting and acceleration. During starting and acceleration, the hydraulic booster 12 of the rear wheel circuits is not provided with the pressure of the master cylinder 2, so that hydraulic pressure cannot be produced mechanically. For this reason, when it is judged on the basis of an information supplied from the wheel speed sensor that slippage prevention control is necessary, the solenoid of the boosting mechanism 60 provided for the hydraulic booster 12 is excited, so that an electromagnetic force is applied to the piston which receives the pressure of the master cylinder 2 during normal braking. Hence, the pipeline 122c is able to obtain output pressure similar to the one generated by the predetermined master cylinder pressure. This pressure is introduced into the variable pressure reducer 23, which reduces the hydraulic pressure to a level appropriate for the control of slippage prevention and supplies the thus reduced pressure to the wheel cylinder 43. As a result, the acceleration slippage of the drive wheels during starting and acceleration is prevented appropriately.

FIG. 1 shows, for convenience' sake, an arrangement in which only the front wheel hydraulic booster 11 is provided with the initial hydraulic pressure raising mechanism 50, but only the rear wheel hydraulic booster 12 or both of the front and rear wheel hydraulic boosters may be provided with such mechanisms 50.

Next, a description will be given of the arrangements and operation of the hydraulic boosters 11 and 12 and the variable pressure reducers 21 and 23.

Front wheel hydraulic booster 11

First, a detailed structure of the hydraulic booster 11 will be described with reference to FIGS. 2 to 5. The hydraulic booster 11 mainly comprises a coil 250 constituting the initial hydraulic pressure raising mechanism 50, a cancel spring 50a, and a body 200 accommodating a hydraulic valve section.

The hydraulic valve section is arranged such that an input piston 231 receives the pilot pressure from the pilot pipe 121a communicating with the master cylinder 2 to mechanically regulate the hydraulic pressure supplied from the accumulator 8 via the pipe 121b to a level a predetermined number of times the pilot pressure. This hydraulic valve section has the following main components: The input piston 231 receiving the pilot pressure inside an input cylinder 230; a valve piston 211 abutting against the right-hand end of the input piston 231; an inner valve body 205 for closing a line between the output pipe 121c and the reservoir 5 and allowing them to communicate with each other by coming into contact with the right-hand end portion of the valve piston 211 (see FIG. 3C) and by being separated from the same (see FIG. 3B); and an outer valve body 204 disposed slidably around an outer periphery of the inner valve body 205 and adapted to control the communication between the pipe 121b and the output pipe 121c. In addition, the hydraulic valve section has an offset spring 11a for biasing the piston 231 rightwards, a seal spring 208 urging an inner peripheral projection of the outer valve body 204 leftwardly, and the cancel spring 50a for urging the valve piston 211 leftwardly via a push rod 207 and an armature 256.

To give a further description, the coil 250 has, as its major component members, a core 251 formed of a magnetic body, a cover 252, a stator 253, and a ring 254 formed of a nonmagnetic body. Of the members, the core 251, the ring 254 and the stator 253 are connected to each other by means of soldering or the like and are secured to each other oil-tightly. A winding 255 is provided in a space formed by the four main structural members including the three component members just mentioned and a cover 252 provided therearound. The stator 253 accommodates the armature 256 in the center thereof. In other words, a magnetic circuit is formed by the core 251, the cover 252, the stator 253 and the armature 256, and a attracting force due to this magnetic force acts on the armature 256 and moves the armature 256 rightwardly. A circular hole is formed in the center of the surface of the core 251 directed toward the armature 256 to receiver the cancel spring 50a which is formed by a compression coil to constantly bias the armature 256 leftwardly.

The stator 253 is connected oil-tightly to the body 200 of the valve body, and both the stator 253 and the armature 256 abut against a retainer 209 incorporated in the body 200. This retainer 209 retains a sealing O-ring so that the oil will not leak between the body 200 and a shaft 206. This shaft 206 is hollow and accommodates therein the push rod 207 concentrically and smoothly slidably. When not operated, the push rod 207 has its right-hand end abutting against the armature 256 and it left-hand end abutting against the right-hand end of the valve piston 211. The left-hand end of the valve piston 211 always abuts against the input piston 231. The input piston 231 is disposed in the input cylinder 230 and is urged at its left-hand end rightwardly by the offset spring 11a. Normally, however, the urging force of the cancel spring 50a transmitted via the push rod 207 and the armature 256 is greater than that of the offset spring 11a, so that the valve piston 211 remains pushed to the left end until the armature 256 is brought into contact with the right-hand end surface of the retainer 209.

An outline of the valve body section will now be described. A sleeve 212, a seat 202 and a sleeve 203 are securely fixed inside the valve body 200 by means of pressure fitting or a similar method. The reason why these portions are independent of the body 200 and fixed thereto is as follows: The body 200 and the retainer 209 should desirably be formed of a nonmagnetic body so as not to affect the magnetic characteristics of the coil 250, whereas the sleeves supporting the sliding members of the valve and the materials of the valve seat should desirably be formed of a material having good slidable characteristics and high hardness. The valve piston 211 and the outer valve body 204 are respectively disposed substantially oil-tightly and slidably within the two sleeves 212 and 203. In addition, the inner valve body 205 is disposed oil-tightly and slidably around the outer periphery of the shaft 206 (and relative to the outer valve body 204 as well).

Figure 3A:
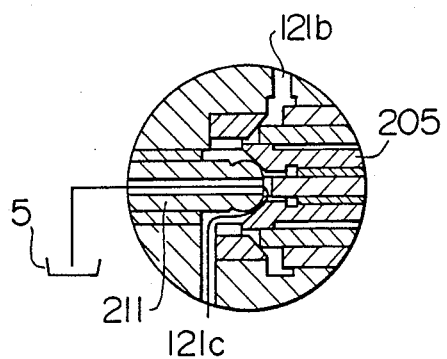
FIGS. 3A-3D are partial enlarged cross-sectional views illustrating the operation of the hydraulic booster.
Figure 3B:
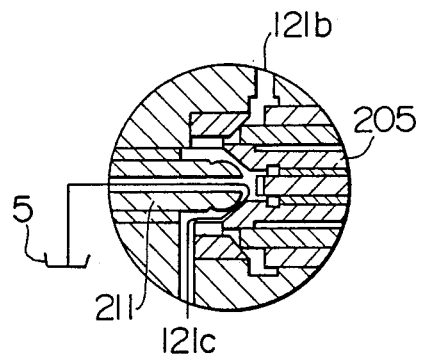

The outer valve body 204 is constantly urged leftwardly by a seal spring 208 abutting against the inner projection thereof and remains stationary in contact with the seat 202. For this reason, when an outer valve comprising the outer valve body 204 and the seat 202 is not operated, the outer valve is constantly closed and shuts off the communication between the port 121b from the hydraulic source and the output port 121c. The inner valve body 205 is disposed between the projection on the inner surface of the outer valve body 204 and the seat 202 or a stopper 221 provided inside the body 200. The overall longitudinal length of the valve body 205 is set to be slightly shorter than the length between the projection of the outer valve body 204 and the stopper 221 with the outer valve body 204 abutting against the seat 202. On the other hand, the valve piston 211 has its right-hand end forming a valve-closing means which cooperate with the left-hand end of the inner valve body 205 to form an inner valve. As described earlier, however, since the valve piston 211 is pushed leftwardly by the left-hand end of the push rod 207, the valve piston 211, when not operated, is in a state in which it communicates with an inner passage of the inner valve body 205, as shown in FIG. 3A, via a groove formed in the tip of the push rod 207. For this reason, during the period of non-operation, the output pipe 121c communicates via the inner valve (formed by the valve body 205 and the valve piston 211) with a port leading to the reservoir 5. It should be noted that, since the diameter of the seat of the inner valve body 205 is set to be identical with that of the shaft 206, the inner valve body 205 is not subjected to any thrust which is dependent on the pressure, regardless of the ambient pressure.

Two spaces respectively formed on the left- and right-hand ends of the outer valve body 204 communicate with each other through a passage (not shown), and the areas of these ends exposed to the spaces are equal, so that the outer valve body 204 is not affected by the pressures in the two spaces.

Figure 3C:
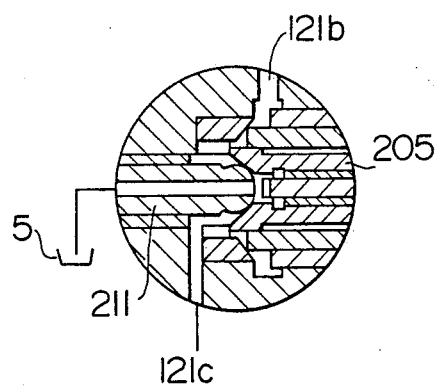
Figure 3D:
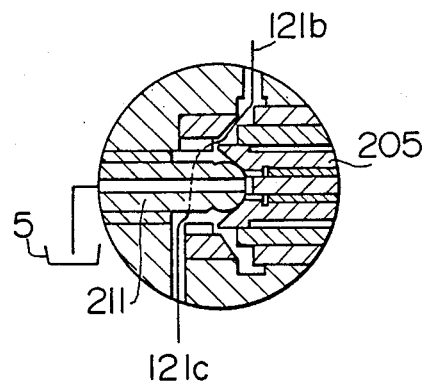

A description will be made of the operation of the hydraulic booster 11. At the time of applying the brakes, if the driver steps on the pedal 1, a pressure is generated inside the master cylinder 2 and transmitted to the input cylinder 230 via the pipes 111 and 121a. Simultaneously with this initial operation of the pedal 1, a signal from the switch 4 provided on the pedal 1 is input to the ECU which in turn energizes the coil 250. Due to this energization, the armature 256 tends to be moved towards the core 251. If the magnetic force becomes greater than the force of the cancel spring 50a, the armature 256 moves rightwardly. For this reason, the push rod 207, the valve piston 211 and the input piston 231 move rightwardly by being pushed back by the offset spring 11a. As a result of this movement, the valve piston 211 is brought into contact with the inner valve body 205 to close the inner valve constituted by these two members, as shown in FIG. 3C. The inner valve body 205, when further moved by the offset spring 11a, moves the projection of the outer valve body 204 rightwardly. Consequently, the outer valve constituted by the outer valve body 204 and the seat 202 is made open. In the above-described operation, the port of the output pipe 121c is shut off from the reservoir 5 and communicated with the pipe 121b leading from the hydraulic source, as shown in FIG. 3D. Hence, high-pressure oil enters the output pipe 121c up to the initial hydraulic pressure, causing the pressure of the wheel cylinders 41 and 42 to rise.

At this time, the outer valve body 204 and the inner valve body 205 are not subjected to any effect of this pressure rise. At the right-hand end portion of the valve piston 211, however, the outer peripheral portion of the piston radially outward of the annular section, in contact with the inner valve body 205 is subjected to this pressure and begins to receive a leftward thrust depending on the pressure. When this thrust is smaller than the force of the offset spring 11a, the inner valve is in the position of increased pressure, shown in FIG. 3D, so that the pressure continues to rise. When the leftward thrust on the valve piston 211 becomes greater due to this pressure rise and becomes slightly grater than the force of the offset spring 11a, the valve piston 211 begins to move leftwardly in such a manner as to balance the forces. Due to this movement, the outer valve body 204 and the seat 202 are closed to prevent and any further pressure rise. This is the state of a neutral position shown in FIG. 3C. The above-described operation is carried out within a very short time after the signal of the pedal switch 4 is detected. For this reason, the driver feels that the brakes have been operated without any delay, and is given a satisfactory feeling.

The forces acting on the valve piston 211 can be expressed by the following equation since the surging force of the offset spring 11a and the leftward thrust of the hydraulic pressure are balanced at this time, as described before:

$$P_{OUT} \cdot S_B = F_O$$

where $P_{OUT}$ is the initial hydraulic pressure of the output pipe 121c, $S_B$ is the annular pressure receiving area at the right-hand end B, and $F_O$ is the urging force of the offset spring 11a. In other words, the initial hydraulic pressure $P_{OUT}$ is given by, $F_O/S_B$, so that this force can be determined freely by the selection of $S_B$ and $F_O$.

At this time, the pressure produced in the master cylinder 2 is still small, but as this pressure is further increased, the input piston 231 begins to receive this pressure with an input pressure receiving area SA thereof and to gradually produce the rightward thrust. Consequently, since the rightward thrust becomes great again, each member is moved again from the neutral position shown in FIG. 3C to the position of increased pressure shown in FIG. 3D and tends to increase the output pressure. This output pressure is in the form of an increased leftward force and increases the output pressure. Thus, the hydraulic booster operates in such a manner as to maintain the balance of the thrusts on the left- and right-hand ends. This balance of thrusts operates in such a manner as to maintain a relationship given by the following equation:

$$P_{M/C} \cdot S_A + F_O = P_{OUT} \cdot S_B$$

where $P_{M/C}$ is the pilot pressure from the master cylinder 2 and $S_A$ is a pressure receiving area at the left-hand end A of the input piston 231. This equation can be rewritten as follows:

$$P_{OUT} = S_A/S_B \cdot P_{M/C} + 1/S_B \cdot F_O$$

Figure 4:
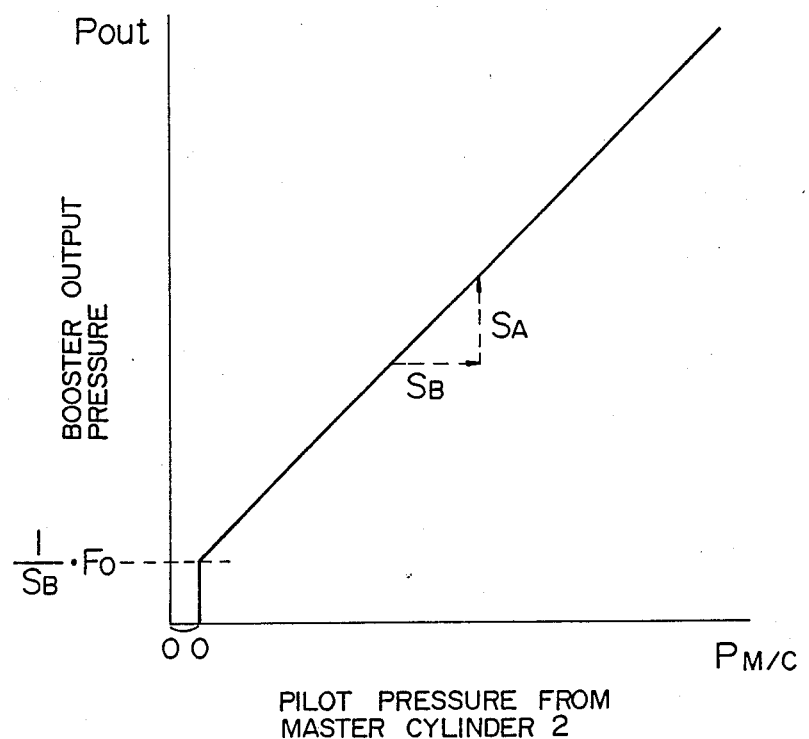
FIG. 4 is a graph illustrating the output characteristics of the hydraulic booster.

FIG. 4 illustrates this characteristic. As shown in FIG. 4, the hydraulic booster 11 has the characteristic of regulating the pilot pressure $P_{M/C}$ from the master cylinder 2 a predetermined number of times $(S_A/S_B)$ after the predetermined initial hydraulic pressure $1/S_B \cdot F_O$ has risen by the initial actuation of the brake pedal. This initial hydraulic pressure is preset to a level which will produce such a very small braking force that enables the driver to feel a slight deceleration.

Although, in the above, a description has been made of the initial pressure rise, such as the driver's initial operation of the brake pedal, as well as of the pressure boosting process, the hydraulic booster 11 operates with a balance between leftward thrust and rightward thrust during holding of the pressure and the pressure reduction process which will be described below.

Variations of the pressure are small in a state in which the pressures in the wheel cylinders have risen to some extent and a braking is being carried out stably. However, in cases where the brake is operated by the driver in a subtle manner, variations occur in the rightward thrust acting on the input piston 231. Consequently, in response to a change in the thrust balance, the valve piston 211 moves to the left or right and operates in such a manner as to eliminate a difference in the balance between the thrusts on the left- and the right-hand ends by changing over the position of reduced pressure shown in FIG. 3B, the neutral position shown in FIG. 3C, and the position of increased pressure shown in FIG. 3D. This is the pressure-regulating operation.

To complete the braking, when the driver slackens the force of stepping on the pedal 1 and the pressure within the master cylinder 2 is thus reduced, the rightward thrust declines within the hydraulic booster 11. Hence, the hydraulic booster 11 is frequently changed over to the position of reduced pressure shown in FIG. 3B and, thus, the output pressure correspondingly declines with the ratio of $S_B/S_A$.

When the braking is completed and the driver releases his foot from the pedal 1, the pressure within the master cylinder 2 drops to zero and the signal of the switch 4 disappears. As a result, the ECU stops the energization of the coil 250. Since the magnetic force of the armature 256 thereby disappears, the armature 256 is pushed again leftwardly by the urging force of the cancel spring 50a. Consequently, the push rod 207 pushes the valve piston 211 leftwardly and forcibly returns the same to the initial reduced pressure position (FIG. 3A). In this process, a sudden reduction in the hydraulic braking pressure is possible due partly to the disappearance of the pressure of the master cylinder 2. In addition, since the hydraulic booster 11 is forcibly set in the state of reduced pressure by the cancel spring 50a, it is possible to prevent the so-called lingering phenomenon in which the braking action remains.

As described above, the hydraulic booster 11 is provided with the offset spring 11a for urging the input piston 231 to the position of increased pressure and with the cancel spring 50a for urging the armature 256 to the position of reduced pressure with an urging force greater than that of the offset spring 11a. The booster 11 further has the initial pressure raising mechanism 50 constituting by the coil 250 which is adapted to make ineffective or reduce the urging force of the cancel spring 50a when the driver's initial operation of the brake pedal 1 is detected and which is adapted to make effective the urging force of the cancel spring 50a upon completion of the operation of the brake pedal 1. Accordingly, since the hydraulic pressure from the accumulator 8 can be regulated to the initial hydraulic pressure and output speedily by means of the hydraulic booster 11 substantially in synchronism with the initial operation of the brake pedal 1, it is possible to speedily cause a rise of the braking force in response to the pedal operation by the driver. At the time of stopping, it is possible to effect speedy pressure reduction which prevents the braking force from remaining.

Figure 5:
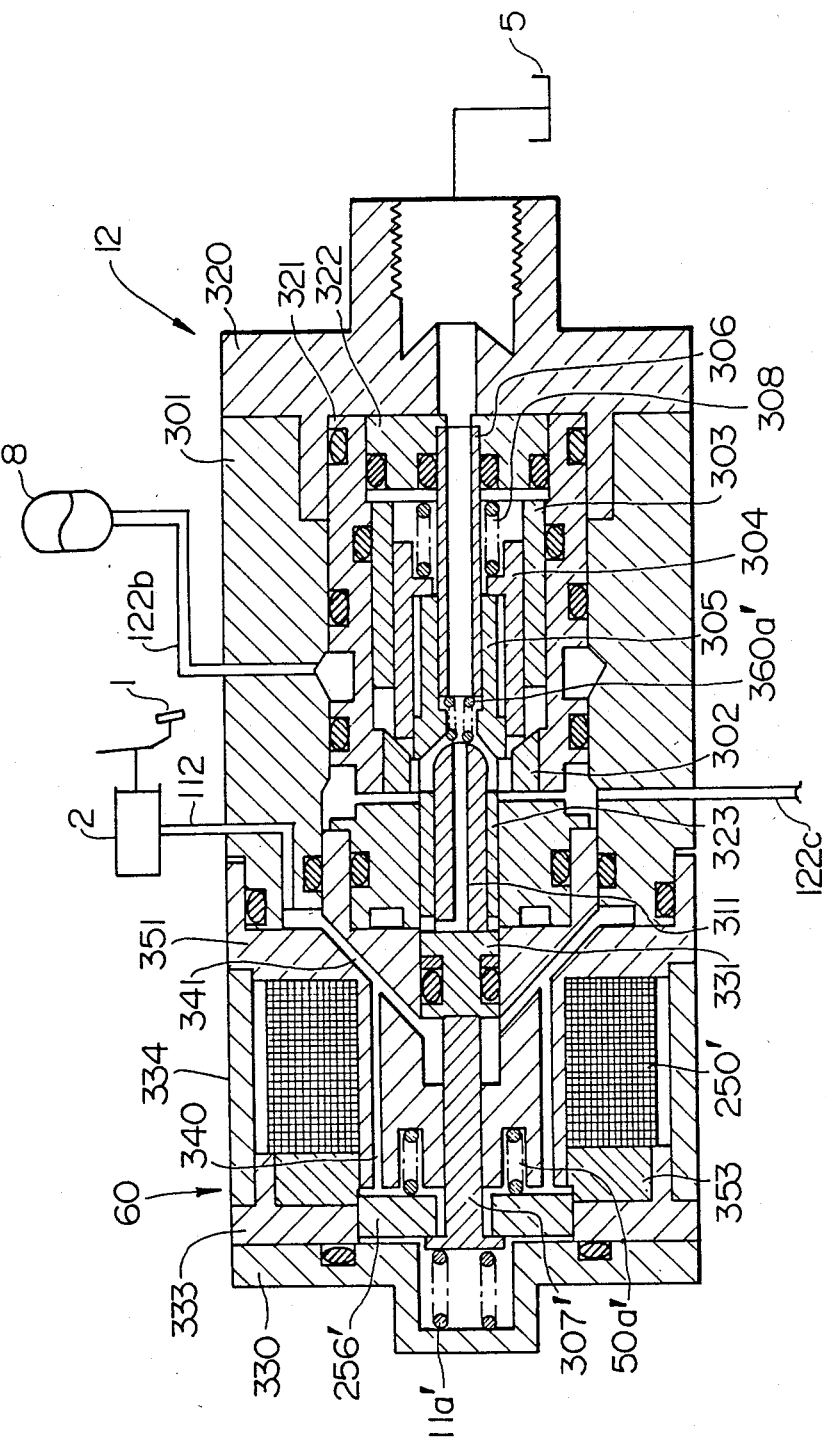
FIG. 5 is a schematic diagram illustrating another example of the hydraulic booster.

The initial hydraulic pressure raising mechanism which is formed by a combination of the offset spring 11a, the cancel spring 50a and the coil 250 for making the same ineffective may be modified to the arrangement shown in FIG. 5, in which a cancel spring 50a', an offset spring 11a' and a coil 250' are disposed on the left-hand side of an input piston 331, as viewed in the drawing, and a rod 307' is inserted between the input piston 331 and the offset spring 11a'. The boost output pressure during the time when the brake pedal is not operated is made to communicate with the reservoir 5 by means of a return spring 306a' disposed between the valve piston 311 and the shaft 306. The urging force of the return spring 360a' may be weak but sufficient to overcome the sliding resistance of a sealing material for the input piston 331. In the arrangement shown in FIG. 5, energizing a coil 256' causes an armature 250' to slide rightwardly, which in turn causes the urging force transmitted from the cancel spring 50a' to a rod 307' to become ineffective. Consequently, by the action of the return spring 11a', the input piston 331, the valve piston 311, etc. move to produce the initial hydraulic pressure.

As described above, since the booster receives as the pilot pressure the pressure of the master cylinder via a pilot pipe, it becomes possible for the booster to be installed separately from the master cylinder. Hence, the efficiency of installation on a vehicle can be improved. In addition, during an initial period when the driver operates the brake pedal, the initial pressure raising mechanism functions to output the predetermined pressure, so that braking can be effected speedily in accordance with the driver's intent. Thus, it is possible to eliminate a time lag in response, thereby improving the braking operation.

What is claimed is:
1. A braking apparatus for a vehicle, comprising:
   a master cylinder for generating a pressure by the operation of a brake pedal;
   an auxiliary pressure source for accumulating a pressure;
   a booster means for receiving as a pilot pressure the pressure of said master cylinder via a pilot pipe and for regulating the pressure supplied from said auxiliary pressure source to a level predetermined times said pilot pressure and then delivering the thus regulated pressure, said booster means including piston means movable by said pilot pressure and an initial pressure raising means including spring means biasing said piston means in one direction and an electromagnetic means responsive to an initial operation of said brake pedal to vary a force of said spring means for thereby allowing said piston means to move whereby the output pressure of said booster means is speedily raised to an initial pressure of a predetermined level; and
   a wheel cylinder for generating a braking force upon receipt of an output pressure of said booster means.
2. A braking apparatus for a vehicle according to claim 1, wherein a variable pressure reducer for reducing the pressure from said booster to a desired level in response to an electric control is provided in a pipe between said booster means and said wheel cylinder.
3. A braking apparatus for a vehicle according to claim 1, wherein a fail-safe valve into which the output pressure of said booster and the pressure of said master cylinder are introduced in parallel and the pressure of said auxiliary pressure source is also received, and which, during a pressure drop of said auxiliary pressure source, introduces the pressure of said master cylinder into said wheel cylinder.
4. A braking apparatus for a vehicle including:
   a master cylinder operable by a brake pedal to generate a pressure;
   an auxiliary pressure source for accumulating a pressure of a pressure medium;
   booster means including piston means adapted to receive as a pilot pressure the pressure of said master cylinder to modulate a pressure from said auxiliary pressure source to a level a predetermined times said pilot pressure;
   a wheel cylinder for receiving the pressure thus modulated by said booster means and generating a braking force for wheels;
   said booster means further including an offset spring for imparting to said piston means an urging force in the direction the same as that of said pilot pressure, a cancel spring for imparting to said piston means another urging force in the direction opposite to that of the urging force of said offset spring, a slidable armature for transmitting the urging force of said cancel spring to said piston means, and an electromagnetic force generating means for electromagnetically actuating said armature to make ineffective the urging force of said cancel spring;
   a braking operation detecting means for detecting an initial operation of said brake pedal; and
   initial energizing means for energizing said electromagnetic force generating means when the initial operation of said brake pedal is detected by said braking operation detecting means.
5. A braking apparatus according to claim 4, wherein said piston means comprise an input piston for receiving said pilot pressure, a valve piston having an end disposed in contact with an end of said input piston, an inner valve member movable into and out of sealing engagement with the other end of said valve piston to connect and disconnect an output of said booster means to and from a hydraulic pressure reservoir, an outer valve member slidably disposed around an outer peripheral surface of said inner valve member to control a communication between said booster means output and said auxiliary pressure source, a push rod slidably disposed in said inner valve member and adapted to push said valve piston, and a valve seat co-operable with said outer valve member;

said booster means further including a seal spring biasing said outer valve member towards said valve seat;

said outer valve member being adapted to engage with said inner valve member to transmit the force of said seal spring to said inner valve member to move the same towards said the other end of said valve piston;

the urging force of said offset spring acting on said input piston and said valve piston in the same direction as that of said pilot pressure;

said the other urging force of said cancel spring acting on said push rod so that said push rod urges said valve piston in the direction opposite to the direction of the urging force of said offset spring;

the arrangement being such that, when the brake pedal is initially operated, said the other urging force of said cancel spring is made ineffective so that said offset spring is allowed to cause said valve piston to move said inner valve member and thus said outer valve member against said seal spring to separate said outer valve member away from said valve seat whereby said auxiliary pressure source is communicated with said booster means output to speedily raise the pressure in said wheel cylinder.

* * * * *